United States Patent [19]

Cornish et al.

[11] Patent Number: 5,256,367
[45] Date of Patent: Oct. 26, 1993

[54] PIPE AND SEWER LINING METHOD

[75] Inventors: Cornell D. M. J. Cornish, Washington, D.C.; Robert J. Follini, New York; Eugene J. Camali, Oyster Bay Cove, both of N.Y.

[73] Assignee: Superliners USA, Inc., Bronx, N.Y.

[21] Appl. No.: 782,555

[22] Filed: Oct. 25, 1991

[51] Int. Cl.$^5$ .................. B29C 63/34; B29D 23/22
[52] U.S. Cl. ................... 264/516; 156/94; 156/287; 156/294; 264/36; 264/269; 264/37; 264/135; 264/324; 425/210
[58] Field of Search .................. 55/84, 85, 159; 159/6.1, DIG. 10; 264/45.2, 46.1, 36, 37, 514, 516, 269, 347; 156/94, 287, 294; 425/210, 215, 217

[56] References Cited

U.S. PATENT DOCUMENTS

| | | | |
|---|---|---|---|
| 2,575,341 | 11/1951 | Gollmar | 55/85 |
| 3,028,284 | 4/1962 | Reeves | 264/257 |
| 3,111,569 | 11/1963 | Rubenstein | 264/45.2 |
| 3,230,129 | 1/1966 | Kelly | 156/287 |
| 3,511,734 | 5/1970 | Darrow | 264/269 |
| 3,627,290 | 12/1971 | Grieve | 432/48 |
| 3,773,593 | 11/1973 | Casadevall et al. | 156/294 |
| 3,930,931 | 1/1976 | Boughman | 159/6.1 |
| 4,009,063 | 2/1977 | Wood | 264/269 |
| 4,227,891 | 10/1980 | Maguire et al. | 55/85 |
| 4,386,628 | 6/1983 | Stanley | 264/516 |
| 4,640,313 | 2/1987 | Stanley | 264/516 |
| 4,844,721 | 7/1989 | Cox et al. | 55/85 |
| 4,980,090 | 12/1990 | Manchak, Jr. | 264/36 |

FOREIGN PATENT DOCUMENTS

| | | | |
|---|---|---|---|
| 3727635 | 3/1989 | Fed. Rep. of Germany | 55/84 |
| 63-159409 | 7/1988 | Japan | 55/84 |
| 1039836 | 8/1966 | United Kingdom . | |
| 1340068 | 12/1973 | United Kingdom . | |

Primary Examiner—Jeffery Thurlow
Assistant Examiner—Mathieu Vargot
Attorney, Agent, or Firm—C. D. M. J. Cornish

[57] ABSTRACT

This invention relates to liners containing contaminants, such as styrene, and to methods for lining pipes, such as sewer pipes with liners containing contaminants, such as styrene. In one embodiment, this invention provides a liner and lining method that reduces contamination of the ambient with contaminants from the liner and/or the lining process, such as styrene. In the case of sewers, the carrier pipes lined may be, for example, PVC, clay or concrete, but pipes of metal or other materials, such as asbestos, may also be lined with the liner and lining method of this invention.

14 Claims, 1 Drawing Sheet

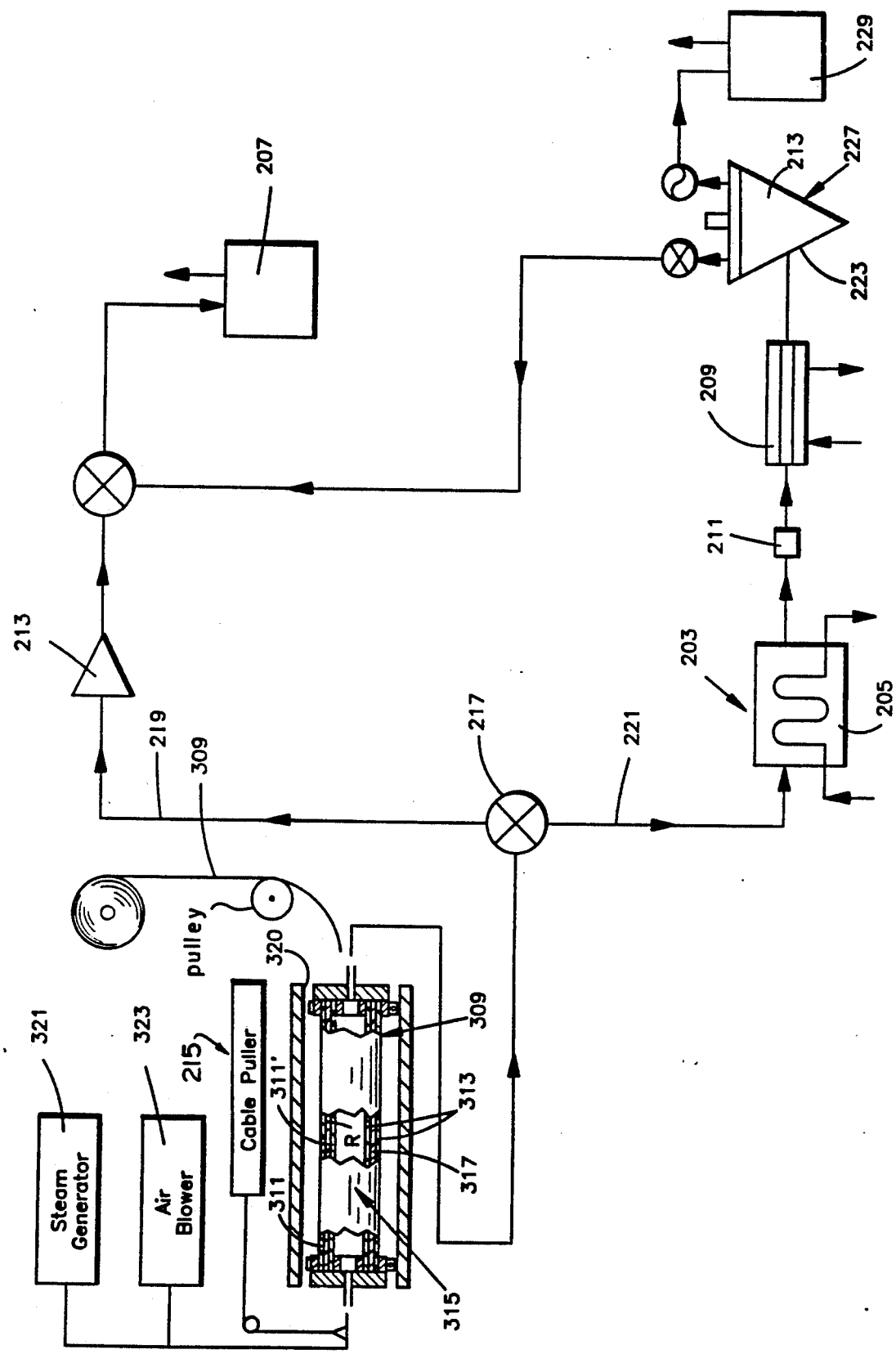

PIPE AND SEWER LINING METHOD

BACKGROUND OF THE INVENTION

In the field of pipe liners and lining methods, a need exists for the reduction or control of the contamination of the ambient, that is caused by the liners or lining methods used. This is particularly true in the field of sewer pipes, since these carrier pipes are numerous and they are located in places of high population density where contamination has been a problem. Moreover, large numbers of these pipes cannot be dug up, or it is impractical or expensive to do so, and because many of these pipes need relining in order to prevent danger to these sewage treatment plants connected thereto.

Styrene is one of the dangerous contaminants present in the liners and lining methods used heretofore. For example, in the liner and lining method described in Wood U.S. Pat. No. 4,009,063, the lining is totally impregnated with resins containing styrene, and this or other contaminants have been released to the atmosphere during the lining process. In some cases gaseous styrene was released from the impregnated liner because hot air or steam was circulated through the liner during the curing process, and no effective provision or steps were made to prevent the release of the styrene from the hot air or steam in cases where the styrene was volatilized or stripped out of the resin by the hot air or steam. In other cases, the liner itself was porous or perforated, either on purpose or by accident during the insertion or curing of the liner in a sewer pipe, and this perforation was on the outside of the liner.

SUMMARY OF THE INVENTION

This invention overcomes the difficulties and shortcomings of the prior art by providing a liner that is at least partially closed up to the air or steam used during the curing process. This configuration, being at one end of the surface of liner at a specific location near the end of the liner, helps prevent the liner from being ruptured on the outside of the liner during the lining process. These specific configurations also help control the release of the styrene from the lining at a particular location where provision can be made to further process the air and/or steam exhaust and capture the styrene under controlled conditions with suitable apparatus and procedures. With the proper selection of components and their use, as described in more detail hereinafter, the desired reduction in styrene release or contamination of the ambient is provided.

In another aspect, this invention also provides a specific styrene scrubbing process and apparatus, as will be understood in more detail hereinafter, referring to U.S. Pat. No. 4,009,063, which is incorporated by reference herein.

In one embodiment, this invention provides a method of lining a surface at least partially defining a passageway wherein a laminate of non-woven felt sandwiched between an outer membrane and an inner membrane is urged by fluid pressure so that said outer membrane lies against said surface, said method including the additional step of totally impregnating the felt with an uncured thermosetting resin so as to completely immerse the felt in the resin, and curing the resin while the laminate is held against said surface so as to form a hard, cured and self-supporting resin lining having embedded felt reinforcement, said resin containing styrene, and removing and capturing at least some of said styrene that is volatilized and released as a gas during at least a portion of the curing time, wherein one membrane has a small perforation at one end to release the gas from in between the inner and outer membranes so that the styrene can be removed and captured therefrom by stripping and entraining the same in the curing medium, said curing medium comprising air that is dried and filtered to recover the stripped styrene, or steam that is trapped, condensed, cooled and filtered.

BRIEF DESCRIPTION OF THE DRAWINGS

The single figure is a partial schematic drawing of the styrene scrubbing system of this invention.

DESCRIPTION OF THE PREFERRED EMBODIMENT

This invention is useful in removing styrene and/or other contaminants from the resin used in lining sewers or other pipes. As such, this invention is useful in reducing the chemical contamination of the ambient when sewers and other pipes are lined, particularly when they are lined with resins containing styrene. More particularly still, this invention is specifically useful in reducing the contamination of styrene in the ambient around the method used in U.S. Pat. No. 3,511,734, which is incorporated by reference herein, this method closing the liner inside to steam and air by clamps.

Referring to the figure, it will be understood that air and/or steam pressure are used to cure the linings used for sewer pipes, and consequently, if the linings contain styrene, the air and/or steam are vented to the atmosphere, the styrene is injected into the ambient in such a way as to contaminate the ambient air at the site.

In accordance with this invention, the method and apparatus of this invention include an air purification system 201, a steam recovery system 203, which includes a condenser 205 and an activated carbon adsorption canister 207, which advantageously is a 200 pound activated carbon adsorption and purification system.

The steam condensate recovery and purification system 203 comprise a large condensing coil unit 209 that is used to condense the steam used in the lining system to water, and a small condensing coil unit 211 for lowering the temperature of the condensate to below about 100 degrees fahrenheit.

A mechanical drier 213 is also provided to reduce the moisture content of the air coming from the lining system 215. A three-way valve system 217 allows for the collection of the air stream 219 into the activated carbon Canister 207, which may be activated charcoal. Meanwhile, the water condensate from the steam stream 221, which, like the air stream 219, comes from the lining system 215, is collected in as liquid holding tank 223. A pump 225 with a float mechanism 227 is used to pull the condensate water from the holding tank 223 through a water use-activated carbon canister 229, also having a 200 pound capacity.

In operation, the system of this invention always captures the air stream 219 and the steam stream 221 from the lining system 215. Also, the air and steam are always purified during the operation of this invention. The 200 pound carbon canister 229 captures about 20 pounds of styrene from the steam stream before the carbon has to be replaced. These capacities far exceed the anticipated levels of styrene derived during the curing process that produces the desired lined sewer pipe.

The felt is impregnated with an uncured resin as described in Rubenstein, U.S. Pat. No. 3,111,569 hereby incorporated by reference. Other felt materials including chopped strand mat having unidirectional glass fibers up to a weight of 800 g/m², continuous filament mat up to a weight of 900 g/m², ENKAMAT (trademark) brand continuous filament mat produced of monofilament polyamid and having fibers that are connected at spaced apart intervals to form a mechanically or chemically bonded mat having a weight of around 330 g/m², SPHEREMAT (trademark) brand material having a weight of between about 450–900 g/m², and other woven and non-woven materials with or without roving. The styrene is stripped in accordance with the method taught in Cox, U.S. Pat. No. 4,334,721, likewise incorporated by reference. This patent discloses styrene absorption in fluid systems including water, water and oil, $KMnO_4$, and high boiling phthalates, such as dibutyl phthalate.

During the processing of the styrene by this invention, the surrounding ambient air is monitored for styrene air concentrations in the ambient atmosphere employing National Institute of Occupational Safety and Health (NIOSH) method 1501, which is the technique requested and approved by NYDEP's HAZMAT division. In this connection, it has been found that styrene has a minute solubility in water, such as the water waste product of the lining system of the 4,009,063 patent incorporated by reference herein, as mentioned above. Thus, OSHA has imposed strict permissible Exposure Limits (PEL's) on the system of that invention.

In this connection, the single figure discloses a method of lining an ID surface 301 of carrier pipe 303, which is a sewer pipe 305. The carrier pipe 305 defines a passageway 307, wherein a laminate 309 of non-woven felt is sandwiched between an outer membrane 311 and an inner membrane 311' of plastic sheet material 313 that is urged by fluid pressure 315 so that said outer membrane lies against said surface, said method including the additional step of totally impregnating the felt with an uncured thermosetting resin so as to completely immerse the felt in the resin, and curing the resin while the laminate is held against said surface so as to form a hard, cured and self-sustaining resin lining having embedded felt reinforcement R. The felt is shown in the drawing as element 317 and the resin is referred to as element 319. Clamp 320 clamps ends 0 closed.

This invention has the advantage of supplying a practical and economic system for lowering the contamination of air with styrene around the site of pipe linings. In another aspect, this invention also has the advantage of applying the principles thereof to the conventional steam generator 321 and air blower 323 of the figure.

What is claimed is:

1. A method of lining a surface at least partially defining a passageway wherein a laminate of non-woven felt is sandwiched between an outer membrane and an inner membrane is urged by fluid pressure so that said outer membrane lies against said surface, said method including the additional step of totally impregnating the felt with an uncured thermosetting resin so as to completely immerse the felt in the resin, and curing the resin while the laminate is held against said surface so as to form a hard, cured and self-supporting resin lining having embedded felt reinforcement, said resin containing styrene, and removing and capturing at least some of said styrene that is volatilized and released as a gas during at least a portion of the curing time, wherein one of said membranes has a small perforation at one end to release the gas from in between the inner and outer membranes so that the styrene can be removed and captured therefrom by stripping and entraining the same in the curing medium, said curing medium comprising air that is dried and filtered to recover the stripped styrene, or stream that is trapped, condensed, cooled and filtered to recover the stripped styrene.

2. The method of claim 1 in which the felt is a material with roving.

3. The method of claim 1 in which the felt is a material without roving.

4. The method of claim 1 in which the felt comprises chopped strand mat having unidirectional glass fibers up to a weight of 800 g/meter squared.

5. The method of claim 1 in which the felt comprises continuous filament mat up to a weight of 900 g/meter squared.

6. The method of claim 1 in which the felt comprises ENKAMAT brand continuous filament mat produced of monofilament polyamid having fibers that are connected at spaced apart intervals to form a mechanically or chemically bonded material having a weight down to about 350 g/meter squared.

7. The method of claim 1 in which the felt comprises SPHEREMAT brand material having a weight between about 450–900 g/meter squared.

8. The method of claim 1 in which at least one of the membranes is made from a perforated plastic sheet material.

9. The method of claim 1 in which the capture and removal includes styrene that is absorbed in a fluid containing water.

10. The method, of claim 1 in which the capture and removal includes styrene that is absorbed in a fluid containing water and oil.

11. The method of claim 1 in which the capture and removal includes styrene that is absorbed in a fluid containing KMnO4.

12. The method of claim 1 in which the capture and removal includes styrene that is absorbed in a fluid containing high boiling point phthalate.

13. A method of lining a surface at least partially defining a passageway wherein a laminate of non-woven felt sandwiched in between an outer membrane and an inner membrane of plastic sheet material is urged by fluid pressure so that said outer membrane lies against said surface, said method including the additional step of totally impregnating the felt with an uncured thermosetting resin so as to completely immerse the felt in the resin, and curing the resin while the laminate is held against said surface so as to form a hard, cured and self-supporting resin lining having embedded reinforcement, said resin containing styrene that is volatilized and released as a gas during at least a portion of the curing time, wherein one of said membranes has a small perforation at one end to release the gas from in between the inner and outer membranes so that the styrene can be removed and captured therefrom by stripping and entraining the same in the curing medium, said curing medium producing waste water including fluid from the lining process that is contained in a collecting tank from which the styrene is recovered.

14. A method of lining a surface at least partially defining a passageway wherein a laminate of reinforcement material sandwiched between an outer membrane and an inner membrane of plastic sheet material is urged by fluid pressure so that said outer membrane lies against said surface, said method including the additional step of totally impregnating the reinforcement material with an uncured thermosetting resin while the laminate is held against said surface so as to form a hard, cured and self-supporting resin lining having embedded reinforcement, said resin containing styrene, and removing and capturing at least some of said styrene that is volatilized and released as a gas during at least a portion of the curing time, wherein one of the membranes has a small perforation at one end to release the gas from in between the inner and outer membranes so that the styrene can be removed and captured therefrom by entraining the same in the curing medium, said curing medium producing waste water including fluid from the lining process that is contained in a collecting tank, air that is dried and filtered, or steam that is condensed, trapped, cooled and filtered from which the styrene is recovered.

* * * * *

UNITED STATES PATENT AND TRADEMARK OFFICE
CERTIFICATE OF CORRECTION

PATENT NO. : 5,256,367
DATED : October 26, 1993
INVENTOR(S) : Cornish, et al

It is certified that error appears in the above-indentified patent and that said Letters Patent is hereby corrected as shown below:

Column 3, line 57, claim 1, before "sandwiched" delete "is".

Signed and Sealed this

Tenth Day of May, 1994

Attest:

BRUCE LEHMAN

Attesting Officer  Commissioner of Patents and Trademarks